July 24, 1962 E. S. McVEY 3,046,488
BALANCED LOAD PARALLEL COUPLED TRANSISTOR CIRCUIT
Filed Sept. 28, 1959
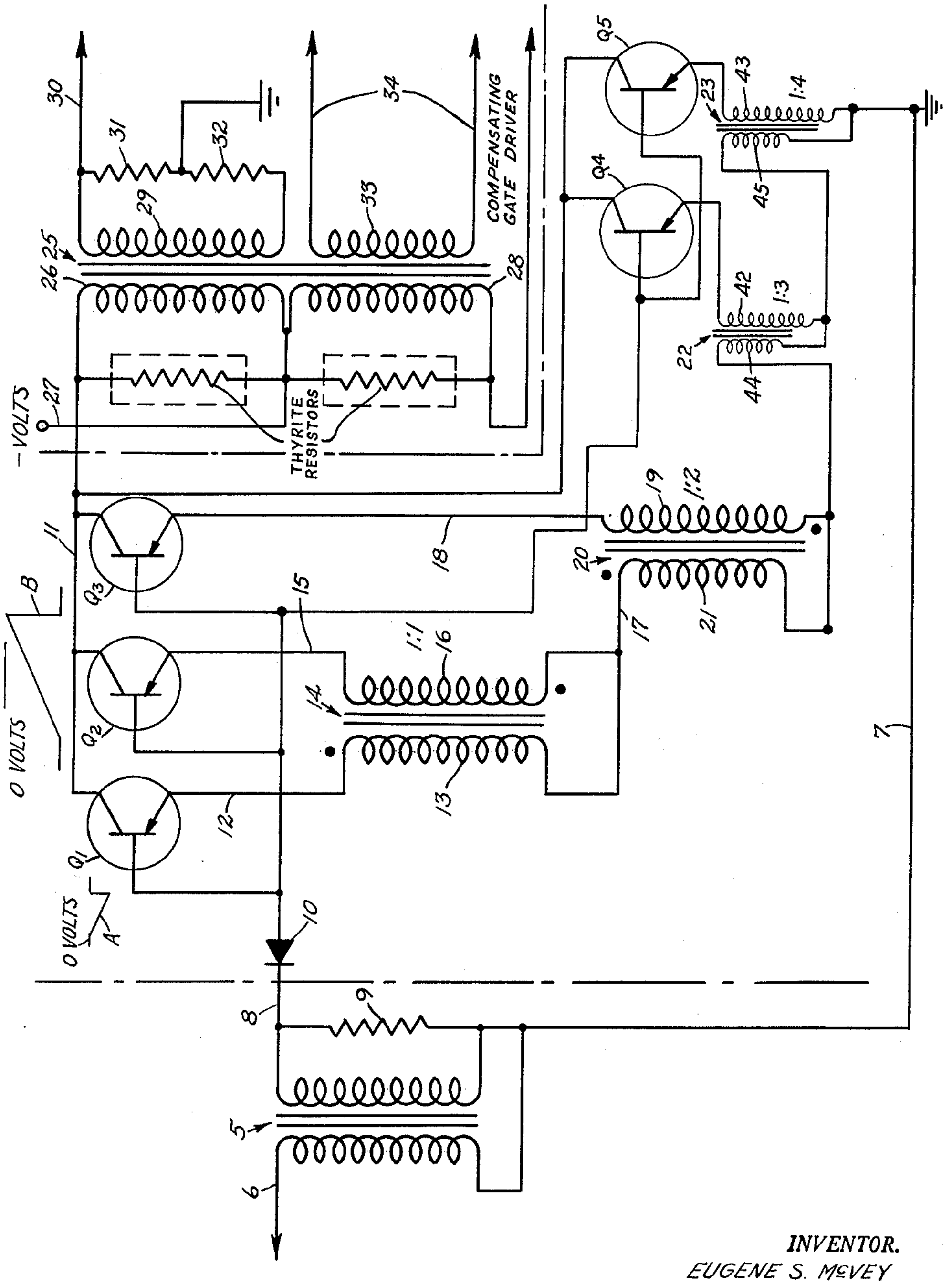
INVENTOR.
EUGENE S. McVEY
BY
H. H. Losche
ATTORNEYS United States Patent Office 3,046,488

Patented July 24, 1962

3,046,488

BALANCED LOAD PARALLEL COUPLED TRANSISTOR CIRCUIT

Eugene S. McVey, Lafayette, Ind., assignor to the United States of America as represented by the Secretary of the Navy Filed Sept. 28, 1959, Ser. No. 843,024

5 Claims. (Cl. 330—30)

(Granted under Title 35, U.S. Code (1952), sec. 266)

The invention described herein may be manufactured and used by or for the Government of the United States of America for governmental purposes without the payment of any royalties thereon or therefor.

This invention relates to a load balancing circuit and more particularly to a load balancing circuit for a plurality of semiconductors or transistors operating in parallel to supply sufficient current to drive a device having high current requirements.

It is well known by those skilled in the art that semiconductors of the transistor type have maximum current limitations which ordinarily limit them for high voltage-ampere or high current requirements. High amperage is required in driving such devices as, for example, the sweep circuits or resolver networks related to the deflection coils or deflection plates of a cathode ray tube or other indicator scope devices. Vacuum tubes are most commonly used in circuits for applications requiring the higher current requirements and such vacuum tube circuits have proved successful in operation for these purposes. The disadvantages of vacuum tube circuits, however, are that these circuits require considerable space and involve considerable weight which is detrimental to aircraft applications where space and weight must be held to a minimum. Further, vacuum tube circuits are not too reliable under conditions of continuous vibration as is found in aircraft applications. Semiconductors and transistors require much smaller volume and are of much less weight in comparison with vacuum tube circuits and likewise are much more reliable under conditions of extreme vibration.

In the present invention the use of semiconductors or transistors is desirable in view of their small space and weight characteristics although it is necessary to use a plurality thereof to provide the necessary current requirements of some applications such as in a device to drive sweep circuits of a cathode ray tube indicator scope. The additional number of semiconductors or transistors required in parallel circuits does not destroy the advantages gained in space and weight requirements over similarly used vacuum tube circuits and at the same time the advantage of semiconductor and transistor reliability is utilized. The only additional problem involved in the requirements of using a plurality of semiconductors or transistors is that of balancing the loads on the transistors to maintain these transistors each within their proper dissipation abilities which is within their allowable current limitations. In the present invention a plurality of transistors are shown and described as being coupled with the bases and collectors thereof in parallel between a single input source and an output load. Since semiconductors or transistors have inherently different internal characteristics in that they cannot maintain equality of load internally among them, this load balance is maintained by transformer coupling the emitters such that the transformers will equalize the currents going through each of the emitters of the semiconductors or transistors coupled in parallel. This is accomplished by coupling the emitter of each of two of the plurality of transistors through one each winding of a one-to-one transformer that is reversely polarized and coupled in common to a potential source. Any unbalance of currents causes a voltage to be developed at such a polarity as to restore balance. The emitter of the third transistor of a plurality may be coupled through one winding of a one-to-two reversely polarized transformer and the common coupling of the one-to-one transformer coupled to the other winding of the one-to-two transformer, the two windings of the one-to-two transformer being coupled to a voltage potential for supplying current through the three emitters of the three transistors. Any unbalance in the emitter current of the third transistor with the combined currents of the emitters in the first two transistors will cause a voltage to be developed of a polarity in the one-to-two transformer to equalize the load in the three transistors. A fourth transistor of a plurality could likewise be coupled through a three-to-one transformer in like manner, or the transistors paired with each pair being coupled through one-to-one transformers, to balance the load in four transistors and this technique could be carried on extensively to any number of transistors required to furnish a desired voltage-ampere load. While the above brief description has been given with respect to the use of P-N-P type transistors, it is to be understood that emitter current loads in N-P-N type transistors could be balanced as well, or the balancing circuitry could be applied to the collector circuitry since it is so well understood by those skilled in the art that either type transistor can be utilized with the proper polarities established. It is, therefore, a general object of this invention to provide a load balancing network for a plurality of semiconductors or transistors operating in parallel to supply a high voltage-ampere load.

These and other objects, advantages, features, and uses may become more apparent to those skilled in the art when considered in view of the accompanying drawing illustrating one preferred embodiment of this invention which figure illustrates a circuit diagram of five transistors coupled in parallel with the load balance networks coupled through the emitters thereof.

Referring more particularly to the figure of the drawing, an input transformer 5 has its primary coupled from an input conductor 6 to a fixed potential such as ground. The input conductor 6 may be coupled from a driver amplifier or the like (not shown) of a signal frequency source. The secondary of the transformer 5 is coupled between a conductor 8 and a fixed or ground potential on the conductor 7. A resistor 9 is coupled in parallel to the secondary of transformer 5 to dampen the flyback of signal pulses such as sweep pulses or the like used in driving the transistor circuit.

The conductor 8 from the secondary of transformer 5 is coupled through a diode 10 in common to the bases of each of transistors $Q_1$, $Q_2$, $Q_3$, $Q_4$, and $Q_5$. The diode 10 protects the base-emitter diode action of the transistors against reverse currents which, if permitted, would have damaging effects on the transistors. The collectors of the transistors $Q_1$ through $Q_5$ are coupled in common to a conductor 11 of a collector voltage source and an output circuit to be described hereinbelow. The emitter of transistor $Q_1$ is coupled through a conductor 12 to a winding 13 of a transformer 14 and the emitter of transistor $Q_2$ is coupled through a conductor 15 and a winding 16 of transformer 14. The opposite leads of transformer 14, windings 13 and 16, are coupled in common to a lead 17, the windings 13 and 16 being of the same number of turns but reversely wound to provide a reversely polarized one-to-one transformer. The emitter of transistor $Q_3$ is coupled through a conductor 18 and through a winding 19 of a transformer 20 to the conductor 7 of common or fixed potential such as ground. The conductor 17, being the common coupling to the windings 13 and 16 of transformer 14, is coupled through a winding 21 of transformer 20 to the conductor 7 of fixed potential. The winding 19 of transformer 20 has double the number of turns of the winding 21, the windings 19 and 21 being reversely wound to provide an oppositely polarized one-to-two transformer. The transformer 14, coupled in the manner shown and described, will cause a current flow in the emitters of transistors $Q_1$ and $Q_2$ and equal currents in these emitters resulting from equal currents in the respective windings 13 and 16 will produce a null in the transformer core. Any unbalance of currents in the emitters of transistors $Q_1$ and $Q_2$ will produce an unbalance of current in windings 13 and 16 to cause currents and voltages in the windings of a polarity to bring the current flow of these two windings back into current equilibrium. Since the transformer 14 is wound in a one-to-one ratio, the currents will at all times be balanced in the emitters of transistors $Q_1$ and $Q_2$. The current supplied to the transistors $Q_1$ and $Q_2$ emitters is by way of conductor 17 through the winding 21 of transformer 20. The amperage of current supplied over the conductor 17 and through the winding 21 of transformer 20 will be double the amperage of the current passing through the winding 19 of transformer 20 and over conductor 18 through the emitter of transistor $Q_3$. The transformer 20 being in a one-to-two ratio will maintain this two-to-one current amperage relationship to balance the currents in the emitter of transistor $Q_3$ with the sum of the currents in the emitters of transistors $Q_1$ and $Q_2$. In this manner the currents in each of the emitters of transistors $Q_1$, $Q_2$, and $Q_3$ will be kept in balance at all times thereby balancing the loads through the emitter and collector circuits of these transistors. Transistors $Q_4$ and $Q_5$ have their emitters coupled through one each winding 42 and 43 of transformers 22 and 23, respectively. The winding 44 of transformer 22 has one terminal coupling the common terminal of the windings 19 and 21 in transformer 20 and the other terminal coupled in common with one lead of the winding 42. The winding 45 of the transformer 23 has one terminal coupled to the common terminal of windings 42 and 44 of transformer 22, the other terminals of windings 43 and 45 being connected to the ground potential conductor 7. The transformers 22 and 23, like transformers 14 and 20, are each oppositely polarized with the transformer windings 44, 42 being in a one-to-three winding turns ratio and with the transformer windings 45, 43 being in a one-to-four turns ratio. The pattern and sequence of equalizing the currents in each of the emitters of the transistors $Q_1$ through $Q_5$ are illustrated in the figure of drawing which could be continued for other stages, if desired.

The collector output of the transistors $Q_1$ through $Q_5$ is over conductor 11 which is circuited through a transformer primary winding 26 of a transformer 25 to a negative voltage source by way of conductor 27. Another winding 28 of transformer 25 is coupled from the conductor 27 to a compensating gating driver circuit or other compensating circuit to improve rise time response (not shown) to return the flux density of the transformer 25 to a quiescent point after each voltage swing produced from the output 11 of the transistor circuit as will be more fully understood in an example of operation given hereinbelow. Such compensating circuits form no part of this invention but may be of a type more fully disclosed in the text "Pulse And Digital Circuits" by Millman and Taub, published by the McGraw-Hill Company, Incorporated (1956), chapter 3. One secondary winding 29 of transformer 25 has an output lead 30 which may be coupled through a resolver, or the like, of an output circuit to be driven by the transistor circuit. The secondary winding 29 has two series resistors 31 and 32 coupled in parallel thereto, the junction of these resistors being grounded. A secondary winding 33 of transformer 25 may be coupled to a resolver mechanism (not shown) which may have one winding grounded in order to produce a fast sweep. The secondary winding 33 having output conductors 34 may be used in a time sharing circuit with the output 30 of the secondary winding 29, where desirable, to change the sweep characteristics of a cathode ray tube. The input transformer 5 and the output transformer 25 are described herein more particularly to provide a basis of an example of operation for the load balanced parallel transistor circuit shown between the broken lines, the balanced load transistor circuit being the subject matter of this invention. It is to be understood that other types of input may be coupled through the conductor 8 and other types of output may be coupled to the conductor 11 where other applications are to be made of the load balance transistor circuit.

In the operation of this invention let it be assumed for the purpose of example that the transformers 5 and 25 are coupled to the balanced load transistor circuit as shown in the drawing. Let is further be assumed for the purpose of example that the circuit, as illustrated in the drawing, is for the purpose of driving the sweep circuits for the deflection coils or deflection plates of a cathode ray tube indicator scope or the like although the balanced load transistor circuit is not limited thereto. For example, negative sawtooth voltage waves may be applied to the primary of transformer 5 over conductor 6 which negative voltage waves are applied through the diode 10 to the bases of transistors $Q_1$ through $Q_5$. As the negative going sawtooth voltage wave on the bases of these transistors is applied, the collector voltages will rise from the negative voltage level applied from the negative voltage source over the conductor 27 to approach zero voltage or the voltage of the emitter source. As the voltage on the bases of the transistors becomes more negative, the emitter-collector current increases from that produced from the fixed voltage source 7 to the negative voltage source 27. This emitter current flow will be maintained in a balanced condition as a result of the emitter couplings through transformers 14, 20, 22, and 23 as shown and hereinabove described. Any attempt of any one of the transistors, $Q_1$, $Q_2$, $Q_3$, $Q_4$, or $Q_5$, to assume a greater portion of the load will be prevented by the emitter load balancing circuitry. The negative voltage wave on the bases of the transistors is shown by the waveform A and the output waveform on the common collector 11 is shown by the waveform B. As is well known in the art, each sweep pulse B conducted through an inductance as the primary winding 26 of transformer 25 normally produces an overshoot or overswing which is undesirable for the deflection circuits or deflection plates of a cathode ray tube. The compensating gate driver (not shown) coupled to the winding 28 of transformer 25 produces a pulse to exactly equal the overdriving or overswinging voltage pulse produced by the sweep pulse B. The output pulses would then be inductively coupled through the transformer 29 to drive the resolver or deflection circuits (not shown) by the sweep pulses. The current necessary to drive the transformer 25 is shown and described herein as requiring five transistors although it is to be understood that in different applications more or less than five transistors in parallel may be required to provide the necessary voltage-ampere load requirements. The fourth transistor $Q_4$ could also be paired with $Q_3$ through a one-to-one transformer and the two one-to-one transformers supplying emitter currents to transistor pairs $Q_1$, $Q_2$, and $Q_3$, $Q_4$ could then be supplied current through the windings of another one-to-one transformer. By the latter means all transformers used would be one-to-one wound, and this means could always be used when the transistors in parallel are even in number. Each additional transistor could likewise be coupled in parallel and the emitter currents thereof maintained in balance to balance the loads through the plurality of transistors. Althrough the load balance network is specifically described for use with semiconductors or transistors, it is to be understood that the invention may be equally applicable to vacuum tubes or other elements in parallel.

While many modifications and changes may be made in the constructional details and features of this invention to provide the load balanced transistor circuit for other or general applications without departing from the spirit and scope of this invention, it is to be understood that I desire to be limited only by the scope of the appended claims.

I claim:

1. A load balancing circuit for semiconductors operating in parallel to a load comprising: a plurality of semiconductors each having a control electrode and two conduction electrodes, said control electrodes adapted to be coupled in common to a signal voltage and said conduction electrodes being coupled in parallel with a load and a supply voltage source, one of said conduction electrodes being coupled to said load; and a plurality of transformers coupled to balance the current flow through the other conduction electrodes of said semiconductors, said transformers each having the windings reversely polarized with one end of the winding leads of each transformer coupled in common, the windings of one transformer of the plurality of transformers being equal in number of turns and coupled by the other ends of the winding leads respectively to each of the other conduction electrodes of two semiconductors, the windings of succeeding transformers of said plurality of transformers each having the other end of one winding lead coupled to the common coupling of the preceding transformer and the other end of the other winding lead coupled to the other conduction electrode of another semiconductor of said plurality of semiconductors, the ratio of the number of turns of said windings of each transformer being in accordance with the number of semiconductors connected thereto, and the common coupling of the last transformer winding leads being coupled to said supply voltage source whereby induced currents in the windings of said transformers caused by unbalanced load across the conduction terminals of said semiconductors connected thereto will produce opposition to these currents to balance the load between said semiconductors.

2. A load balancing circuit as set forth in claim 1 wherein said semiconductors are transistors in which said control, one, and other electrodes are base, collector, and emitter electrodes, respectively.

3. A load balancing circuit as set forth in claim 2 wherein said one transformer of the plurality of transformers has the number of turns of the windings thereof in a one-to-one ratio, and the next succeeding transformer has the number of turns of the windings thereof in a two-to-one ratio, the ratios of the number of turns of the windings of transformers increasing by one as each succeeding transformer couples additional transistors through the emitter thereof.

4. A load balancing circuit for transistors operating in parallel to a load comprising: a plurality of transistors having their base electrodes coupled in common to a signal voltage and the emitter and collector electrodes coupled in parallel between a supply voltage source and a load, said collector electrodes being coupled in common to said load; and a plurality of reversely polarized transformers coupled in sequence between the emitter electrodes and said supply voltage source in circuit with said load, said transformers each having one end of each winding coupled in common, a first transformer of said plurality of transformers in this sequence having each of the other windings thereof coupling the emitter of each of two transistors and the remaining transformers each having one of the other windings coupling the common coupling of the preceding transformer in said sequence and the other of the other windings coupled to the emitter electrode of another transistor of said plurality of transistors, the common coupling of the windings of the last transformer in said sequence being coupled to said supply voltage source, and the ratio of the number of turns of said windings of each succeeding transformer in said sequence of transformers increasing by one from said first transformer having a one-to-one number of winding turns ratio whereby currents through the emitters of said transistors are equalized to equalize the loads carried by each transistor.

5. A load balancing circuit as set forth in claim 4 wherein said, coupling of said base electrodes to said signal voltage source includes a diode between said signal voltage source and the base electrodes of said transistors to protect said transistors against reverse currents.

References Cited in the file of this patent

UNITED STATES PATENTS

| | | |
|---|---|---|
| 2,497,166 | Goldberg | Feb. 14, 1950 |
| 2,875,284 | Ehret | Feb. 24, 1959 |
| 2,941,154 | Rogers | June 14, 1960 |